United States Patent Office 3,442,244
Patented May 6, 1969

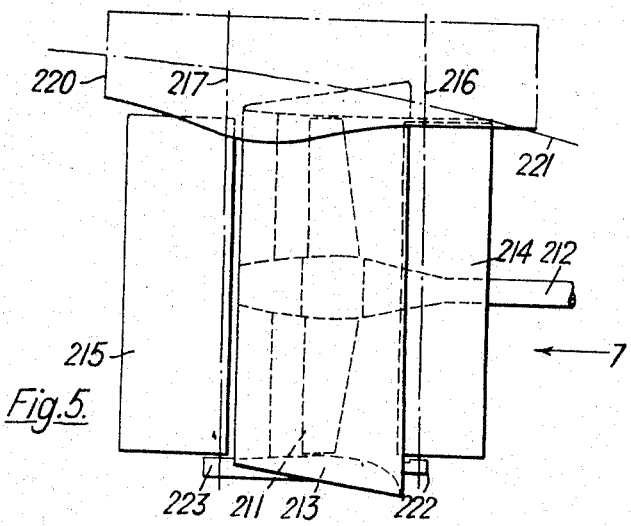
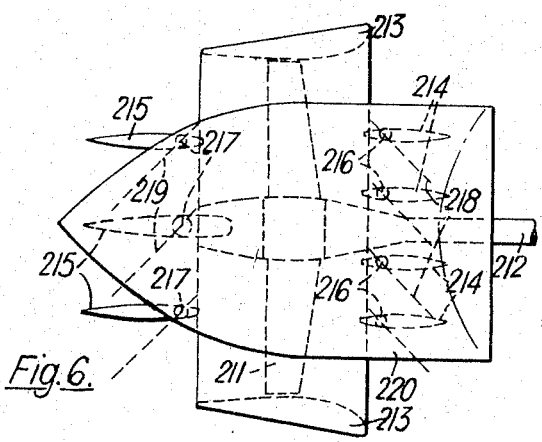
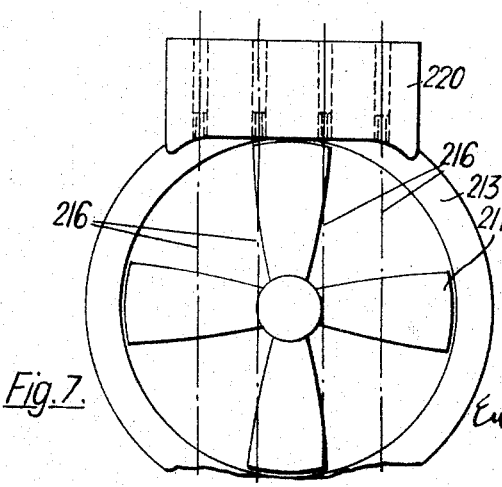

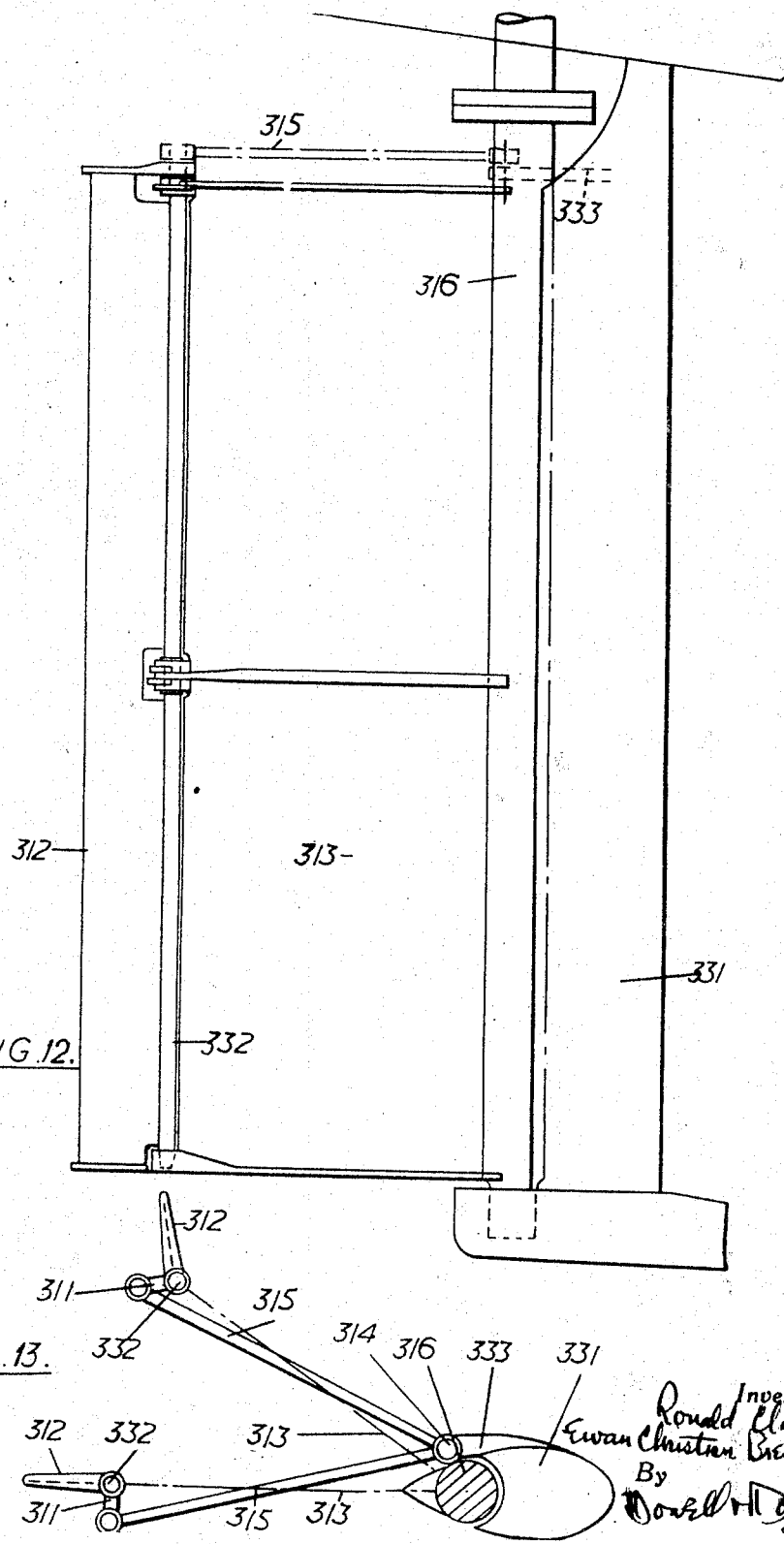

3,442,244
PROPULSIVE SYSTEMS FOR VESSELS
Ronald Clark and Ewan Christian Brew Corlett, Basingstoke, England, assignors to Hydroconic Limited, London, England, a British company
Continuation of application Ser. No. 597,283, Nov. 28, 1966. This application Aug. 30, 1968, Ser. No. 757,223
Int. Cl. B63h 25/06, 1/14
U.S. Cl. 114—163                                          9 Claims

ABSTRACT OF THE DISCLOSURE

The invention comprises a propulsion and steering assembly for a marine vessel in which a propeller operates within a fixed nozzle and a set of rudder blades are mounted to turn about vertical pintles at the immediate exit of the nozzle. There are three or more of these rudder blades, equidistantly-spaced, and ganged to turn as one; that is to say, the blades are turned as a set to various steering angles while the individual blades maintain a parallel relationship one with another. It is a feature of the arrangement that the blades are set at a spacing such that one prevents break-away of the water stream on the negative pressure side of the blade next to it at larger steering angles of the order of 60° and this enables a beneficial enchanced steering effect to be achieved by virtue of hydro-dynamic "lift" on the negative pressure sides of the blades. The requirement for absence of breakaway also demands that the blade should be close to the nozzle exit so as to lie in the still coherent stream issuing from the nozzle and the planes of the blades must be within that stream, i.e. they must lie well inside the vertical planes tangential to the opposite sides of the nozzle. There may be a similar set of blades at the nozzle entry, for use primarily when going astern.

---

Figure 1:
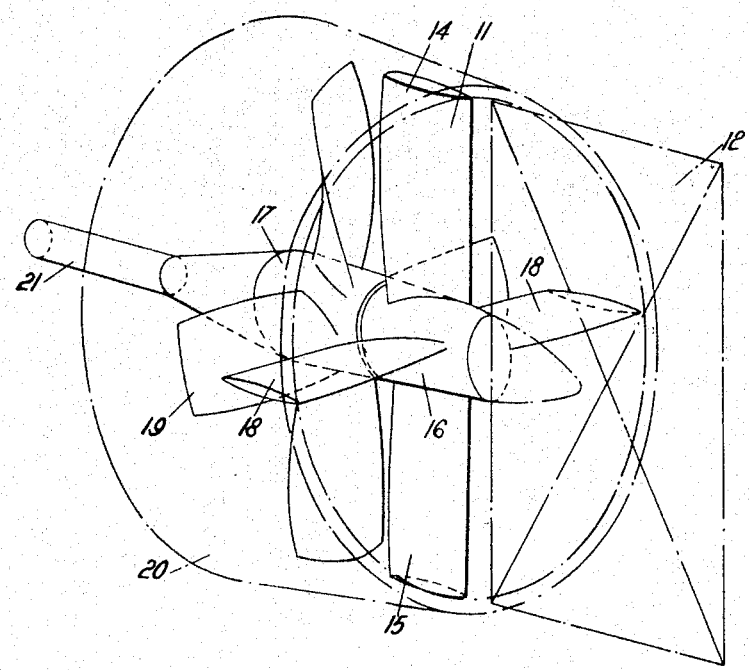

This application is a continuation of Ser. No. 597,283, filed Nov. 28, 1966, now abandoned.

This invention relates to the steering and propulsion of marine vessels, especially tugs and towing vessels.

The propulsion nozzle is a thrust augmenting device commonly fitted to screw-propelled vessels with screws operating under conditions of high loading. With such nozzles, steering may be effected by rotating the entire nozzle, which has the disadvantage of increasing the clearance from the screw to the nozzle and thereby reducing thrust; or by a normal rudder system, which has the disadvantage that it gives no steering when going astern; or by a normal rudder at exit of the nozzle for ahead steering and two flanking rudders, one on either side of the propeller shaft forward of the nozzle for astern steering.

In vessels which operate under high conditions of slip, i.e. tugs, it is generally desirable to fit large propellers and hence large nozzles where these are installed. With a single rudder or twin flanking rudders, even at large angles of helm, such as 60°, full blanking off of the nozzle and diversion of flow is not easy without having recourse to rudders of very large chord. As a result there is a tendency for a compromise to be effected between the propeller diameter and the rudder size, making the rudder rather larger than would otherwise be chosen and the propeller rather smaller, thereby limiting the performance of the vessel.

Furthermore, in the race from a propeller, especially under conditions of high slip, there is a considerable rotation component in the wake from the propeller and this store of energy is wasted in the overall propulsion of the vessel.

An object of the invention is to improve the steering of fixed nozzle vessels and at the same time reduce the steering torque, as compared with conventional installations, and extract hitherto wasted energy from the propeller race.

According to one aspect of the present invention, there is provided a propulsion and steering assembly for a marine vessel, comprising a propeller operating within a fixed propulsion nozzle, and having a set of multiple rudders or vertical shutters working at the entry and/or the exit of the nozzle.

It is a feature of such a system that the total torque for a given effect varies inversely as the square root of the number of rudder fins or blades and hence such an arrangement allows of considerably reduced steering gear torque.

Any number of rudder blades may be employed but it it desirable that when they are turned to port or starboard, the nose of one should be covered in a fore and aft direction by the tail of another, thereby allowing no straight-through flow and forcing the entire flow through the cascade formed by the rudder blades and discharging it in the direction of the blade chord. By so doing a very high efficiency of steering is obtained, impact losses are lessened compared with using a single or double blade, and the blades themselves can be of very simple construction with relatively light bearings at top and bottom compared with those of a normal rudder.

In one embodiment, the bending movement produced by the "lift" of each of the blades may be reduced by a horizontal strut fitted across the entrance or exit of the nozzle and containing bearings for the blades thereby effectively halving their span. In another embodiment, the stocks of the multiple rudders may be taken above the top of the nozzle into a sponson box where they may be coupled to one another thereby forming a self-contained steering nozzle system which may be constructed and added separately to a vessel without affecting rudder alignment.

In order to effect propeller withdrawal, the exit blades may be carried in a ring forming the tail or exit of a nozzle which may be detachable from the nozzle complete with the cross-strut, if fitted, and with the blades of the multiple rudders in their bearings.

When a screw propeller operates at high screw loadings, a considerable amount of rotational energy is left in the screw race in the form of rotational movement of the water leaving the screw. This rotation involves a considerable waste of energy.

An object of the invention is to provide a system which will utilise a considerable amount of energy from the rotation of the screw race by restoring it as fore and aft propulsive effort on the vessel.

According to another aspect of the present invention, a propulsive device for a marine vessel comprises a screw propeller in combination with a contra-stator having arms or blades that straighten out, at least in part, the screw race produced in the water by the propeller and thereby convert at least some of the rotational energy of the screw race into propulsive effort.

The system can be used for any vessel where there is a fairly high screw loading and a considerable amount of rotational energy left in the screw propeller race. In particular the system is intended for use with nozzle-screw propulsive systems but it can be used without such a propulsive nozzle.

Tugs are vessels which commonly operate in congested or restricted waters and in close proximity to other vessels. By nature of their service they must do this continually without the risk of damaging other vessels and high manoeuvrability is required. For various reasons, including the necessity to fit a large propeller, tugs normally have a large rake of keel and this tends to produce a turning center, i.e. a point about which the vessel will turn, which is rather near the stern compared with practice for normal vessels. The afterwards position of this turning center tends to reduce the moment arm of a rudder about it and this effect is accentuated by the fitting of a device such as a fixed propulsion nozzle which further influences the turning centre to an aft position. When going astern, therefore, the vessel turns about what is now a very far forward position in the direction of motion, i.e. close to the stern, the moment arm of the rudder is extremely small and the vessel is unstable directionally by virtue of its shape, i.e deep leading edge and negative rake of keel.

According to a further aspect of the present invention, a steering system for a marine vessel having its turning centre aft comprises a stern rudder for use when going ahead and a bow rudder for use when going astern. In the preferred form, the stern rudder has a trailing edge flap which is automatically controlled so that whenever the main stern rudder blade turns from the fore and aft or straight ahead position the flap thereon turns through a greater angle.

Preferably also, the bow rudder is arranged to stream naturally in the fore and aft position when the vessel is going ahead. An interlock may be provided to hold the stern rudder in the fore and aft position when the vessel is going astern.

Figure 2:
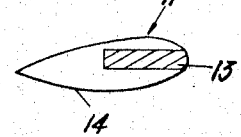
Figure 3:
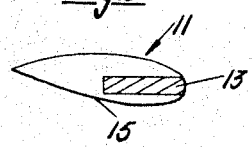
Figure 4:
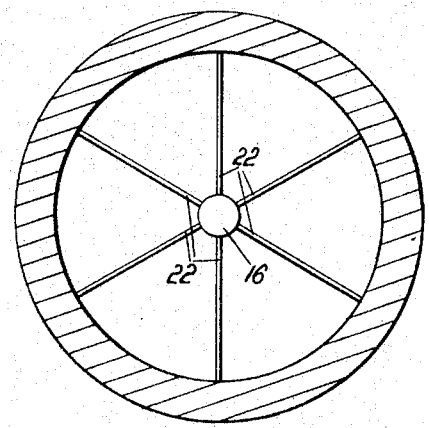
Figure 8:
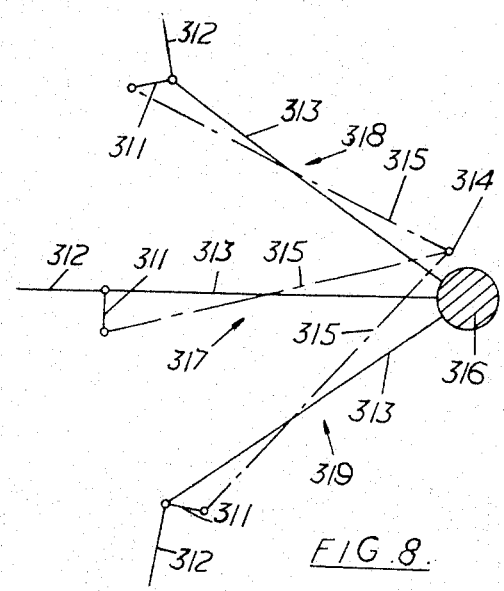

Forms of construction in accordance with the invention will now be described by way of example and with reference to the accompanying drawings, in which:

FIGURE 1 is a perspective diagram of a screw propeller and contra-stator,

FIGURES 2 and 3 show the cross sections of the upper and lower vertical arms, respectively, of the contra-stator, FIGURE 4 is a cross section of an alternative six-armed contra-stator, FIGURE 5 is a side elevation of a propulsion nozzle fitted with multiple rudders, FIGURE 6 is a plan view of the nozzle of FIGURE 5, FIGURE 7 is an end elevation looking in the direction of the arrow 7 of FIGURE 5, FIGURES 8 to 11 illustrate three schemes for control of a trailing or slave flap of a stern rudder, and FIGURES 12 and 13 are respectively a side elevation and plan of a stern rudder embodying the scheme of FIGURE 8.

FIGURE 1 shows a vertical rudder post 11 which is angled so as to present its sections at suitable angle of incidence to the screw race, thereby to extract lift from the rotating screw race. The rudder post 11 is arranged as a bulb post in a type of "bulb rudder," the movable portion of the rudder consisting of a flap 12. The post 11 comprises a vertical bar 13 without twist to which are attached fairing plates 14, 15 as shown in FIGURES 2 and 3, these fairing plates being of opposite incidence and thereby matched to the incident angle of flow of the screw race. The junction between the two fairings is effected by means of a horizontal axial bulb 16 in way of the propeller boss 17 and from this bulb run two further faired arms 18 extending horizontally. The fairings of the arms 18 are likewise angled to suit the incident flow and the whole forms a contra-stator which tends to counteract rotation of the screw race and in so doing extracts useful energy as hydrodynamic lift on its surface, the forward component of which is added to the propulsive thrust of the screw propeller 19.

The propulsive device may have its after or forward end, or both, installed in a nozzle 20, the vertical member 11 forming the post of the bulb-type rudder as aforesaid while the other members 18 are attached to the nozzle 20. The rudder post 11 in this arrangement may be used as a main structural member for the support of the nozzle 20 by penetrating through the nozzle and into the structure of the ship thereby to form an after attachment point for the nozzle itself. The forward end of the bulb 16 at the axial centre of the device may be used as a propeller seating providing a bearing for the aft end of the propeller shaft 21.

The whole device constitutes an effective method of recovering propeller race rotational energy and the advantage obtained is considerable. It also constitutes a practical and readily constructed structure which integrates the function of rudder, nozzle, conta-propeller and hull attachment in a way that is admirably suited to fabrication in steel.

Other arrangements are possible without departing from the scope of the invention. Thus, FIGURE 4 shows an arrangement in which the contra-stator has six equiangularly disposed arms 22, instead of the four arms of FIGURE 1.

In FIGURES 5 to 7 of the drawings, a propeller 211 driven by a propeller shaft 212 works in a propulsion nozzle 213. At the nozzle entry are fitted four equidistantly-spaced vertical rudder blades or shutters 214; three further equidistant blades 215 are fitted at the nozzle exit. The entry blades 214 are each mounted to turn about a respective vertical pivot 216 near the aft edge of the blade, while the exit blades 215 have pivots 217 near their forward edges. It will be observed that the spacing and dimensions of the blades are such that, both in the case of the entry blades and the exit blades, each multiple rudder can be turned until the nose of one blade is covered, in the fore and aft direction, by the tail of the blade next to it, as illustrated by the sets of broken lines 218, 219 in FIGURE 6.

A head box 220 overlies the nozzle 213, projecting beyond it both forward and aft, and serves as the means of securing the unit to the ship's hull 221. Pintles for the multiple rudder blades 214, 215 are journalled at their upper ends in the head box 220 and at their lower ends in bearing brackets 222, 223 projecting forward and aft from the bottom of the nozzle 213. Within the head box the blade pintles of each multiple rudder may be coupled together so that the blades turn in unison.

The blades may be so designed that they extract most or all of the rotational component of the race from the screw, thereby increasing the thrust of the nozzle and propeller assembly by a considerable amount which may be as much as 15%. This is effected, anyway, by the blades even if of symmetrical aerofoil section with zero incidence normally fore and aft due to the fact that the inflow velocity to them from the propeller is at an angle of incidence which results in their generating lift. However, they may be suitably angled or twisted so that the top half and the bottom half have opposite incidence and therefore may be more nearly suited to the inflow angles from the propeller wake and furthermore they may be twisted so that they have a progressive increase in angle of incidence to enable exact matching to the wake of the propeller.

When going ahead, the forward blades 214 are kept fore and aft and steering is effected by the after blades 215. When going astern, the reverse is the case, the forward blades 214 being used for steering and the after blades 215 being kept fore and aft.

Turning now to FIGURES 8 to 13 of the drawings, these are concerned with the provision upon a stern rudder of a controllable trailing edge flap.

The stern rudder consists of either a fixed rudder-post-type rudder with a movable flap, or a moving rudder of the semi-balance type. Either type can be fitted with a trailing edge flap or slave flap which has operative connections such that when the rudder is put over, say, to port the slave flap automatically moves still further over in the same direction. For example, if the rudder is put over 30° to port, the slave flap may be so turned that it is, in fact, pointing directly athwartships. At low speeds, when handling the vessel water directed from the high speed race of the screw strikes the rudder and is deflected right round by the slave flap so that on the pressure side it leaves virtually at right angles to the fore and aft axis of the vessel. The lift of the rudder is, of course, greatly increased and the net result is a very large steering force much greater than that obtained by the rudder without the slave flap.

FIGURE 8 shows a scheme for controlling the slave flap. A tiller arm 311 for the slave flap 312 stands out at right angles thereto from the leading edge of the flap where it is pivotally mounted on the trailing edge of the main rudder blade 313. Close to the rudder stock 316 is a fixed pivotal anchorage 314 for one end of a rod 315 that has its opposite end pivotally connected to the outer end of the tiller arm 311. When the rudder is in the straight ahead position the slave flap 312 is in the same plane as the main rudder blade 313, as shown at 317. It will be observed that the anchorage point 314 lies on the opposite side of the rudder blade 313 to the tiller arm 311 so that the rod 315 crosses through the plane of the blade 313. As a result, when the rudder is swung over to port the slave flap 312 is swung even further to port by the rod 315 acting on the tiller arm 311, as shown at 318, and similarly when the rudder is swung to starboard the flap 312 swings even further to starboard, as shown at 319.

Figure 9:
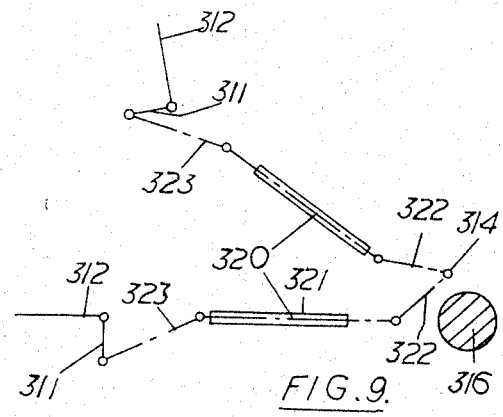

In FIGURE 9, the rod 315 is replaced by a slide 320 working in a horizontal guide 321 on the top of the main rudder blade and parallel to the plane of that blade. The opposite ends of the slide are connected, respectively, to the anchorage point 314 and the outer end of the tiller arm 311 by pivotal links 322, 323.

Figure 10:
Figure 11:
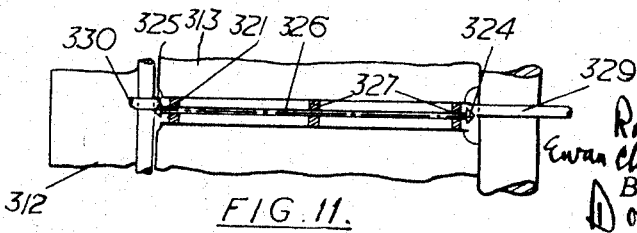

FIGURES 10 and 11 show a further scheme in which the slave flap 312 is operated by a horizontal shaft 326 that lies in the plane of the rudder blade 313 and is mounted for rotation in bearings 327 on the rudder blade. Bevel gears 324, 325 at the ends of the shaft 326 mesh, respectively, with a fixed gear 329 coaxial with the rudder stock, and with a gear 330 fast on the slave flap 312 and coaxial with the pivotal mounting 328 of the flap on the blade 313.

FIGURES 12 and 13 show in more detail the scheme of FIGURE 8 applied to an all-moving balanced rudder. A streamline fixed rudder post 331 provides a mounting for a turning rudder stock 316 that carries the main rudder blade 313. The slave flap 312 is mounted on a slave flap stock 332 at the trailing edge of the blade 313. The lug 333 providing the fixed anchorage 314 for the flap-operating rod 315 is situated on one side of the post 331. Two different positions of the rudder, i.e. straight ahead and swung to port, are show in FIGURE 13.

An advantage of this system is that in the fore and aft position, i.e. when no rudder angle is applied, there is substantially no increase in resistance over and above that of a normal rudder without the slave flap. This is unlike the case of a fish tail which produces a somewhat similar effect but makes a constant and large addition to the resistance and also the steering gear torque at all angles.

The present system does not give as great advantages when maneuvering astern, by virtue of its configuration, but anyway, and especially in the presence of a nozzle, the turning centre is so far aft that the efficiency of any stern rudder system is low.

Combined with the stern rudder, therefore, is a bow rudder; this can also be used on a tug without any other than a normal stern rudder. The bow rudder consists of a pivotally mounted wedge of the forefoot which is under-balanced when going ahead and therefore always streams fore and aft irrespective of whether it has been placed in a central position or not. When going astern, the bow rudder is at the trailing end of the vessel and, due to its large moment arm, a very small rudder area is effective in steering. It is over-balanced in this condition and therefore requires a steering gear capable of holding negative torque. This steering gear may be coupled, either electrically or hydraulically, to the main steering gear and the engine controls, so that when the engine controls are set ahead the steering gear power is fed exclusively to the stern or normal rudder, the bow rudder being left idle and trailing in a fore and aft position. When going astern, an interlock is operative such that the stern rudder is locked in a fore and aft position and steering gear power is applied to the bow rudder only.

We claim:
1. A propulsive and steering assembly for a marine vessel that does not have a stern hull tunnel, comprising a fixed circular nozzle, and a set of at least three equidistantly-spaced vertical progressively-steering rudder blades mounted outside the nozzle at the immediate exit thereof and ganged to turn as one through varying steering angles, said blades being so disposed that their vertical planes, when they are in the straight ahead direction, all lie between the vertical planes that are tangential to opposite sides of the inner circumference of the nozzle ring, and the spacing of the blades being such that when turned to a steering angle of about 60° the nose of one blade is in fore and aft overlapping relationship with the tail of the next blade alongside it.

2. An assembly according to claim 1, and comprising a second set of at least three rudder blades similarly disposed close to the entry of the nozzle.

3. An assembly according to claim 2, wherein the entry and exit rudder blades have vertical pivots near their trailing and leading edges, respectively.

4. An assembly according to claim 3, wherein a head box overlies the nozzle and provides a means of mounting the assembly on a ship, and the rudder blades of at least one multiple rudder set have stocks or pintles that are journalled at their upper ends in the head box.

5. An assembly according to claim 4, wherein the lower ends of the stocks or pintles are journalled in the nozzle or in bearing brackets on the nozzle.

6. An assembly according to claim 5, wherein the blade pintles of at least one multiple rudder set are coupled together within the head box so that the blades turn in unison.

7. An assembly according to claim 1, wherein the top and bottom halves of each blade span are oppositely twisted, for the purpose described.

8. A propulsion and steering assembly for a marine vessel comprising a fixed circular nozzle around which hydrodynamic circulation takes place, and fitted with a set of at least three equi-distantly spaced vertical progressively-steering rudder blades mounted outside the nozzle at the immediate exit thereof and ganged to turn as one about respective laterally-separated fixed vertical axes through varying steering angles, said blades being so disposed that their vertical planes when they are in the straight ahead direction all lie between the vertical planes that are tangential to opposite sides of the inner circumference of the nozzle ring, and so arranged that each of the blades acts to control the hydrodynamic flow over the others as in a cascade, and the spacing of the blades being such that, when turned to a steering angle of about 60°, the nose of one blade is in fore-and-aft overlapping relationship with the tail of the next blade alongside it.

9. An assembly according to claim 8, and comprising a second set of at least three rudder blades similarly disposed close to the entry of the nozzle.

References Cited

UNITED STATES PATENTS 2,201,859   5/1940   Edwards _____ 114—163

FOREIGN PATENTS 1,147,132   4/1963   Germany.
1,316,281   12/1962  France.
6,410,681   3/1966   Netherlands.

ANDREW H. FARRELL, *Primary Examiner.*